(12) United States Patent
Pusdesris et al.

(10) Patent No.: US 12,174,753 B2
(45) Date of Patent: Dec. 24, 2024

(54) METHODS AND APPARATUS FOR TRANSFERRING DATA WITHIN HIERARCHICAL CACHE CIRCUITRY

(71) Applicant: Arm Limited, Cambridge (GB)

(72) Inventors: Joseph Michael Pusdesris, Austin, TX (US); Klas Magnus Bruce, Austin, TX (US); Jamshed Jalal, Austin, TX (US); Dimitrios Kaseridis, Austin, TX (US); Gurunath Ramagiri, Austin, TX (US); Ho-Seop Kim, Austin, TX (US); Andrew John Turner, Cambridge (GB); Rania Hussein Hassan Mameesh, Cambridge (GB)

(73) Assignee: Arm Limited, Cambridge (GB)

( * ) Notice: Subject to any disclaimer, the term of this patent is extended or adjusted under 35 U.S.C. 154(b) by 33 days.

(21) Appl. No.: 18/253,621

(22) PCT Filed: Nov. 18, 2021

(86) PCT No.: PCT/EP2021/082196
§ 371 (c)(1),
(2) Date: May 19, 2023

(87) PCT Pub. No.: WO2022/112099
PCT Pub. Date: Jun. 2, 2022

(65) Prior Publication Data
US 2023/0418766 A1    Dec. 28, 2023

(30) Foreign Application Priority Data
Nov. 25, 2020  (EP) .................................... 20386053

(51) Int. Cl.
*G06F 12/126*  (2016.01)
*G06F 12/0811*  (2016.01)

(52) U.S. Cl.
CPC ........ *G06F 12/126* (2013.01); *G06F 12/0811* (2013.01)

(58) Field of Classification Search
CPC .......................... G06F 12/126; G06F 12/0811
See application file for complete search history.

(56) References Cited

U.S. PATENT DOCUMENTS

| 2006/0143396 A1 | 6/2006 | Cabot |
| 2007/0073974 A1 | 3/2007 | Averill et al. |
| 2010/0235579 A1* | 9/2010 | Biles .................... G06F 12/127 711/E12.001 |

FOREIGN PATENT DOCUMENTS

| CN | 1320464 C | 6/2007 |
| WO | 2007/096572 A1 | 8/2007 |

\* cited by examiner

*Primary Examiner* — Michael Krofcheck
*Assistant Examiner* — Janice M. Girouard
(74) *Attorney, Agent, or Firm* — NIXON & VANDERHYE P.C.

(57) ABSTRACT

Aspects of the present disclosure relate to an apparatus comprising processing circuitry, first cache circuitry and second cache circuitry, wherein the second cache circuitry has an access latency higher than an access latency of the first cache circuitry. The second cache circuitry is responsive to receiving a request for data stored within the second cache circuitry to identify said data as pseudo-invalid data and provide said data to the first cache circuitry. The second cache circuitry is responsive to receiving an eviction indication, indicating that the first cache circuitry is to evict said data, to, responsive to determining that said data has not been modified since said data was provided to the first cache circuitry, identify said pseudo-invalid data as valid data.

14 Claims, 5 Drawing Sheets

METHODS AND APPARATUS FOR TRANSFERRING DATA WITHIN HIERARCHICAL CACHE CIRCUITRY

BACKGROUND

The present technique relates to the field of data storage, and more specifically to cache storage circuitry.

In some processing systems, a processor is coupled to a memory. The memory stores data which is to be accessed by the processor. For example, the memory may be a dynamic random access memory (DRAM). The latency associated with accessing data stored in this memory may be relatively long. Accordingly, in some such systems, cache circuitry is provided which is conceptually "between" the processor and the memory. The cache stores temporary copies of data from the memory, for providing to the processing circuitry. The cache has a smaller capacity than the memory but, as a trade-off, the latency associated with accesses to the cache is less than the latency associated with the memory. Thus, for data which is stored in the cache, a data access request from the processor can be serviced more quickly than a request for data which is not stored in the cache.

In some systems, multiple caches are provided. These may have a hierarchical structure, with multiple levels of cache. Each level is progressively "closer" to the processor, with closer levels having lower access latency but also lower capacity. Data is passed between the memory, the levels of cache, and the processor, according to a caching scheme. For example, in response to the processor issuing a data request, the request may first be propagated through the cache levels and then to the memory, until the data is found. The data may then be provided to the processor and, for example, stored in the cache level nearest to the processor. At a later time, that data may be evicted, either to a cache level further from the processor or back to the memory.

The use of a hierarchical cache structure in this manner consumes power and transmission bandwidth. It would be desirable to improve the efficiency of operation of such a hierarchical cache structure.

SUMMARY

At least some examples provide an interconnect apparatus comprising:
processing circuitry configured to issue access requests in respect of data;
first cache circuitry for storing temporary copies of data from a memory, for providing to the processing circuitry in response to corresponding access requests;
second cache circuitry for storing temporary copies of data from the memory, for providing to the first cache circuitry in response to corresponding access requests, wherein the second cache circuitry has an access latency higher than an access latency of the first cache circuitry, wherein:
the second cache circuitry is responsive to receiving a request for data stored within the second cache circuitry to:
identify said data as pseudo-invalid data; and
provide said data to the first cache circuitry,
the second cache circuitry is responsive to receiving an eviction indication, indicating that the first cache circuitry is to evict said data, to:
responsive to determining that said data has not been modified since said data was provided to the first cache circuitry, identify said pseudo-invalid data as valid data.

Further examples provide a method comprising:
storing, in first cache circuitry, temporary copies of data from a memory, for providing to processing circuitry in response to corresponding access requests;
storing, in second cache circuitry, temporary copies of data from the memory, for providing to the first cache circuitry in response to corresponding access requests, wherein the second cache circuitry has an access latency higher than an access latency of the first cache circuitry;
transmitting, from the first cache circuitry to the second cache circuitry, a request for data stored within the second cache circuitry;
responsive to the second cache circuitry receiving the request for said data:
identifying, by the second cache circuitry, said data as pseudo-invalid data; and
providing said data from the second cache circuitry to the first cache circuitry,
transmitting an eviction notification from the first cache circuitry to the second cache circuitry, indicating that the first cache circuitry is to evict said data; and
responsive to the second cache circuitry receiving the eviction notification, and responsive to determining that said data has not been modified since said data was provided to the first cache circuitry, identifying, by the second cache circuitry, said pseudo-invalid data as valid data.

Further examples provide a system comprising:
memory circuitry;
processing circuitry configured to issue access requests in respect of data stored in the memory circuitry;
first cache circuitry for storing temporary copies of data from the memory circuitry, for providing to the processing circuitry in response to corresponding access requests;
second cache circuitry for storing temporary copies of data from the memory circuitry, for providing to the first cache circuitry in response to corresponding access requests, wherein the second cache circuitry has an access latency higher than an access latency of the first cache circuitry, wherein:
the second cache circuitry is responsive to receiving a request for data stored within the second cache circuitry to:
identify said data as pseudo-invalid data; and
provide said data to the first cache circuitry,
the second cache circuitry is responsive to receiving an eviction indication, indicating that the first cache circuitry is to evict said data, to:
responsive to determining that said data has not been modified since said data was provided to the first cache circuitry, identify said pseudo-invalid data as valid data.

Further aspects, features and advantages of the present technique will be apparent from the following description of examples, which is to be read in conjunction with the accompanying drawings.

DESCRIPTION OF EXAMPLES

As explained above, a processing apparatus may comprise processing circuitry and cache circuitry providing a cache hierarchy. The hierarchy may include first cache circuitry which is closest to the processing circuitry, and second cache circuitry which has a higher access latency than the first cache circuitry.

In such an apparatus according to a comparative example, data may be transferred from the second cache circuitry to the first cache circuitry (for example in response to a request from the processing circuitry). The data is then marked as "invalid" in the second cache circuitry (in a non-inclusive cache hierarchy system). At a later time, the data (which may have been modified) is evicted from the first cache circuitry and transmitted back to the second cache circuitry. In some operating circumstances, for example where a working data set (on which the processor is performing data processing actions, and is thus repeatedly accessing) is larger than the capacity of the first cache circuitry but smaller than the capacity of the second cache circuitry, a "ping-pong" effect can arise in which given data is repeatedly transmitted between the first and second cache circuitry. This consumes power and transmission bandwidth.

In an example of the present disclosure, in which this ping-pong effect is reduced, an apparatus comprises processing circuitry configured to issue access requests in respect of data. The apparatus also comprises first cache circuitry for storing temporary copies of data from a memory, for providing to the processing circuitry in response to corresponding access requests. The apparatus further comprises second cache circuitry for storing temporary copies of data from the memory, for providing to the first cache circuitry in response to corresponding access requests, wherein the second cache circuitry has an access latency higher than an access latency of the first cache circuitry. The first and second cache circuitry thus form a hierarchical structure, which may for example be a non-inclusive cache hierarchy in which given data is not simultaneously held as valid in the first and second cache circuitries. Provision of given data between the first and second cache circuitry may be performed by way of transmitting a cache line comprising the given data.

The second cache circuitry is responsive to receiving a request for data stored within the second cache circuitry to provide said data to the first cache circuitry and also to identify the data as pseudo-invalid data. This is, in effect, a tentative indication that the data may become invalid.

At a later time, the first cache circuitry is to evict the data, for example to make space for data which is to be newly included in the first cache circuitry. The second cache circuitry receives an eviction indication, indicating that the first cache circuitry is to evict the data. For example, the first cache circuitry may transmit the eviction indication to the second cache circuitry.

Responsive to receiving this indication, the second cache circuitry determines whether the data has been modified since it was provided to the first cache circuitry. If it has not been modified, the second cache circuitry identifies the pseudo-invalid data as valid data. The data can thus be deleted from the first cache circuitry without being transmitted back to the second cache circuitry: as the data has not been modified, the pseudo-invalid copy of the data in the second cache circuitry still has the correct value, and can thus be marked as valid.

In this manner, the transmission of the data from the first cache circuitry to the second cache circuitry is not performed, and thus power and bandwidth are saved relative to the above-described comparative example in which pseudo-invalidity is not implemented.

Eviction from the first cache circuitry is mentioned above. However, the second cache circuitry may also apply eviction logic to determine data to evict therefrom. In an example, the second cache circuitry is configured to select data to evict, said selecting comprising preferentially selecting pseudo-invalid data relative to valid data. Said selecting may further comprise preferentially selecting invalid data relative to pseudo-invalid data. Thus, the second cache circuitry may apply an eviction priority in which invalid data has the highest priority to be evicted, followed by pseudo-invalid data, and finally valid data has the lowest eviction priority. This allows pseudo-invalid data to be preferentially kept in the second cache circuitry instead of invalid data, but not at the expense of evicting valid data.

The second cache circuitry may be configured to maintain priority indicators associated with valid data, wherein lower-priority data is preferentially evicted relative to higher-priority data. The second cache circuitry may be configured to identify data as pseudo-invalid by assigning a minimum priority indicator value to said data. This allows pseudo-invalidity identification to be configured in a system without significant modification of the system. However, this also removes a potential priority level which could otherwise have been assigned to valid data.

Alternatively, the second cache circuitry may be configured to identify said data as pseudo-invalid data by setting a pseudo-invalidity indicator in respect of said data. This provides an effective way to identify the data as pseudo-invalid which does not reduce functionality in terms of the number of priority levels which can be assigned to valid data.

Above was described functionality associated with an eviction from the first cache circuitry wherein the data has not been modified since being provided from the second cache circuitry. In an example, in response to determining that said data has been modified since said data was provided to the first cache circuitry, the second cache circuitry transmits to the first cache circuitry a return request for said data. Then, in response to receiving said return request, the first cache circuitry provides said (modified) data to the second cache circuitry to replace said pseudo-invalid data. This example can thus handle data which has been modified, as well as data which has not been modified. Whilst the data is still transmitted from the first cache circuitry to the second cache circuitry if it has been modified, it is often the case that the data has not been modified and thus there is still a significant saving of power and bandwidth relative to comparative systems in which the present disclosure is not implemented.

In one such example, the second cache circuitry is configured to provide data to the first cache circuitry with an associated modification indicator. The first cache circuitry is then configured to, responsive to modifying said data, set the modification indicator to indicate said modification. For example, the modification indicator may be a bit which is flipped by the first cache circuitry. When evicting the data, the first cache circuitry transmits, to the second cache circuitry, said eviction indication comprising the modification indicator. The second cache circuitry can then determine that the data has been modified based on the modification indicator.

The modification indicator may for example be provided responsive to a determination, by the second cache circuitry, that a cache line comprising said data is a dirty cache line. The modification indicator may optionally not be provided if the cache line is a clean cache line, because its status as a clean cache line indicates that it has not been modified. The second cache circuitry can thus absorb multiple dirty evictions of said data from the first cache circuitry, without the data being transmitted and without writing the data back to the memory. Incurred power and bandwidth are thus reduced.

In an example, the first cache circuitry is configured, when evicting said data which is identified in the second cache circuitry as pseudo-invalid data, to not provide said data to the second cache circuitry absent a data request from said second cache circuitry. The saving of power and bandwidth can thus be enforced, by not allowing transmission of the data from the first cache circuitry to the second cache circuitry unless it is requested by the second cache circuitry.

In an example, the second cache circuitry is configured to operate as a shared cache with respect to said processing circuitry and second processing circuitry. This allows the present disclosure to be implemented within a system comprising multiple processors, each of which have their own first cache circuitry but which share a single second cache circuitry.

Examples of the present disclosure will now be described with reference to the drawings.

Figure 1:
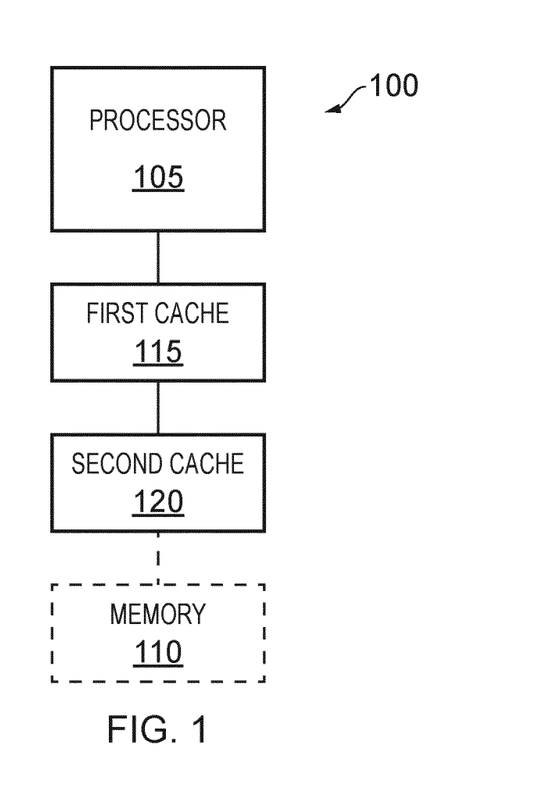
FIG. 1 schematically depicts an example apparatus.

FIG. 1 schematically shows an apparatus 100 according to an example of the present disclosure. The apparatus 100 comprises a processor 105 which is to issue access requests in respect of data which is stored in a memory 110 connected to the apparatus 100. The apparatus 100 comprises a first cache 115 and a second cache 120. Each of the first and second caches 115, 120 are configured to store temporary copies of data from the memory, for faster access by the processor 105. In particular, the first cache 115 is relatively small in size and has an access latency significantly smaller than the memory 110. The second cache 120 has a larger capacity than the first cache, and an access latency which is longer than that of the first cache 115 but still smaller than that of the memory 110. The speed of servicing a data access request can thus be greatly improved, in particular where the processor 105 repeatedly accesses the same data item.

The first cache 115 and second cache 120 form a non-inclusive cache hierarchy. In this hierarchy, a given data item is not typically validly stored simultaneously in the first and second caches 115, 120. For example, if a given data item in the second cache 120 is to be provided to the first cache 115, the second cache invalidates its copy of the data. This avoids duplicate caching and allows for the second cache 120 to be smaller.

Figure 2:
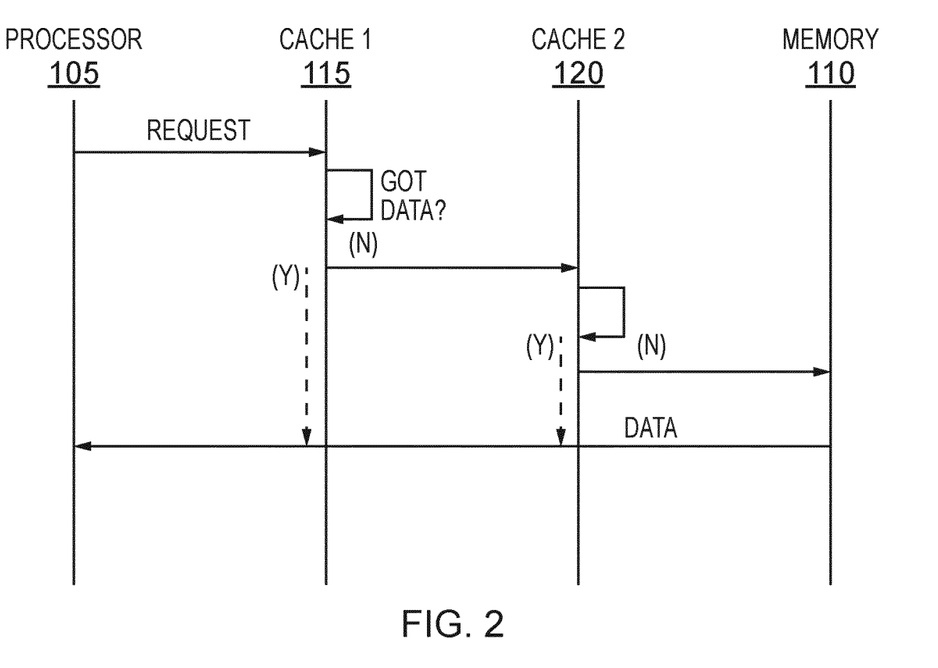
FIG. 2 shows an operational flow by which a data request can be serviced by the apparatus of FIG. 1.

FIG. 2 shows an operational flow by which a data request can be serviced by the apparatus of FIG. 1.

The processor 105 issues a request for a given data item. This request is received at the first cache 115, which determines if the requested data is stored therein. If the data is stored in the first cache 115, the data is provided to the processor 105.

If the data is not stored in the first cache 115, the request is forwarded to the second cache 120, which similarly determines if the requested data is stored therein. If the data is stored in the second cache 120, the data is provided via the first cache 115 to the processor 105. The data may additionally be transferred to the first cache 115 and invalidated in the second cache 120.

If the data is not stored in the first cache 115 or the second cache 120, the request is forwarded to the memory 110. The memory 110 provides the data to the processor 105, via the first and second caches 115, 120. The data may additionally be cached in the first cache 115. In some examples, the data is not cached in the second cache 120.

Figure 3A:
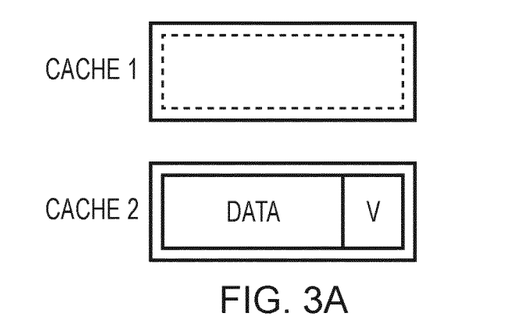
FIGS. 3A to 3C schematically illustrates movement of data between caches, according to a comparative example.
Figure 3B:
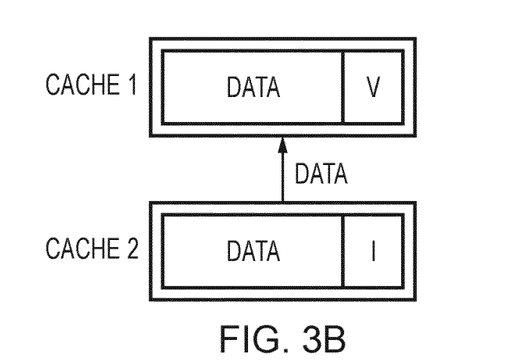
Figure 3C:
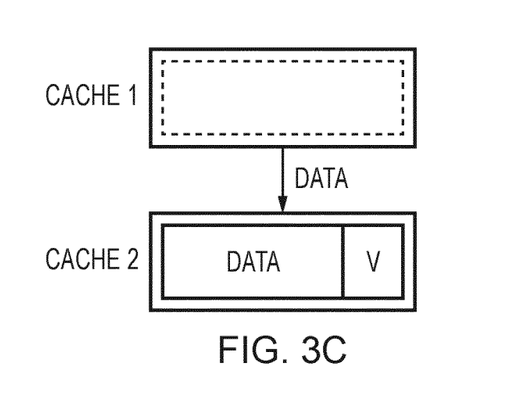

FIGS. 3A to 3C schematically illustrate movement of data between caches, such as the caches 115, 120 of FIG. 1, according to a comparative example.

In the initial configuration, shown in FIG. 3A, a data item is stored in the second cache. The data is stored along with a valid bit V, indicating a valid copy of the data. In an example, prior to this configuration, the first cache had a valid copy of the data item and the second cache did not. After this, the data item was evicted from the first cache, leading to the initial configuration of FIG. 3A.

The data item is subject to a data request, received from the first cache. As shown in FIG. 3B, the data is transmitted to the first cache and stored in the first cache with an associated valid bit V. At the same time, the data in the second cache is invalidated by flipping the valid bit to indicate invalidity I (for example, a bit value of 1 may indicate "valid", and a bit value of 0 may indicate "invalid"). At a later time, if a data item is to be evicted from the second cache to make space for a newly-added data item, invalid data items are preferentially evicted.

At a later time, the data item is to be evicted from the first cache to make space for a new data item. As shown in FIG. 3C, the data is transmitted to the second cache and stored in the second cache with an associated valid bit V.

In this manner, higher-priority (for example more frequently used data) can be moved to the first cache, and then moved back to the second cache when other data has a higher priority. However, if the size of the working data set on which the processor is performing operations is between the size of the first cache and the size of the second cache, this can lead to a "ping-pong" effect in which data is repeatedly transferred between the first and second caches: a given data item in the second cache is requested and thus filled into the first cache, after which it is evicted to make space for new data and returned to the second cache, following which it is requested again and thus re-filled into the first cache, and so on. With each of these steps, the data is transmitted between the first and second caches, consuming power and bandwidth.

An example way of storing and moving data between caches according to the present disclosure, in which this ping-pong effect is reduced or eliminated, will now be described with reference to FIGS. 4A to 4E. This may be implemented with the caches 115, 120 of apparatus 100 as depicted in FIG. 1.

Figure 4A:
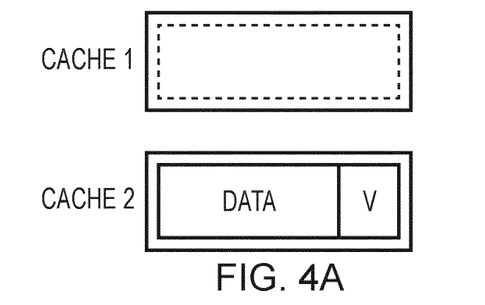
FIGS. 4A to 4E depict an example way of storing and moving data between caches.

In the initial configuration, shown in FIG. 4A, a data item is stored in the second cache 120. The data is stored along with a validity indicator V, indicating a valid copy of the data.

Figure 4B:
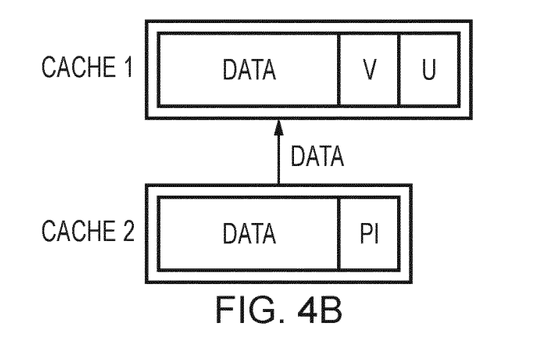

The data item is subject to a data request, received from the first cache 115. As shown in FIG. 4B, the data is transmitted to the first cache 115 and stored in the first cache 115 with an associated validity indicator V, in the same manner as shown in FIG. 3B A modification indicator U is also associated with the data item in the first cache, indicating that it has not (yet) been modified. However, instead of invalidating the data in the second cache 120, the data in the second cache is marked as pseudo-invalid by updating the validity indicator to indicate pseudo-invalidity PI. The validity indicator is thus capable of taking at least three values, and may for example be a two-bit value. At a later time, if a data item is to be evicted from the second cache, invalid data items are preferentially evicted, followed by pseudo-invalid data items and then by valid data items. That is to say, pseudo-invalid data items have a higher priority for remaining in the cache the invalid data items, but a lower priority than valid data items.

At a later time, the data item is to be evicted from the first cache 115.

Figure 4C:
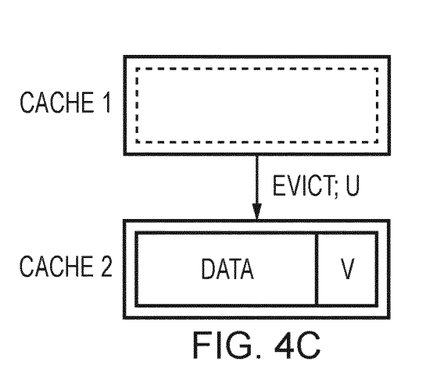

FIG. 4C depicts the eviction if the data item has not been modified since it was filled into the first cache 115. The first cache 115 issues an eviction notification to the second cache 120, indicating that it is to evict the data item. The eviction notification includes the current state of the modification indicator (i.e. "U", indicating "unmodified"). In response to receiving the eviction notification, the second cache 120 determines that it still contains the pseudo-invalid copy of the data item and validates the data item by updating the validity indicator to "V". In this manner, a valid copy of the data item is provided in the second cache 115 without the data item itself being transmitted to the second cache. The aforementioned ping-pong effect is thus averted, with a corresponding saving of power and bandwidth.

Figure 4D:
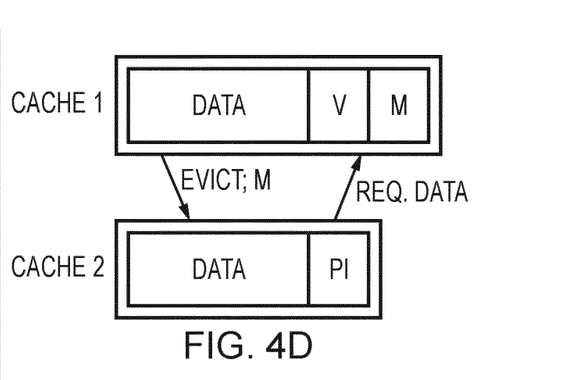
Figure 4E:
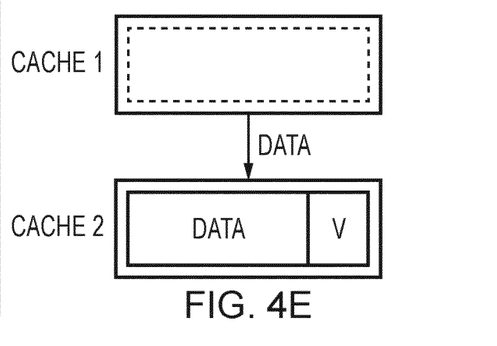

FIGS. 4C and 4E depict the eviction if the data item has been modified since it was filled into the first cache 115. In FIG. 4D, the data item is stored with validity indicator "V" and modification indicator "M", indicating that it is valid and that it has been modified. The first cache 115 transmits an eviction notification comprising the modification indicator "M", to the second cache 120. In response, the second cache 120 requests the data from the first cache 115.

Then, as shown in FIG. 4E, the first cache 115 evicts the data item and transmits the data item to the second cache 120, which stores the data item with validity indicator "V". Thus, in this situation the data item is still transmitted from the first cache 115 to the second cache 120. However, the power and bandwidth saving in situations in which the data item has not been modified leads to an overall saving.

Figure 5A:
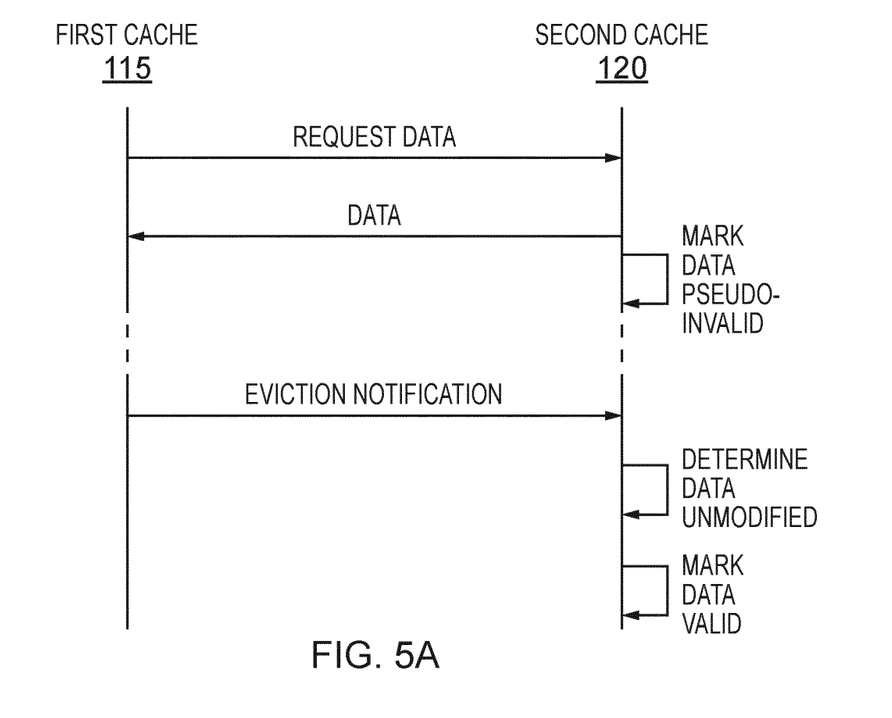
FIGS. 5A and 5B depict example operational flows associated with eviction processes.
Figure 5B:
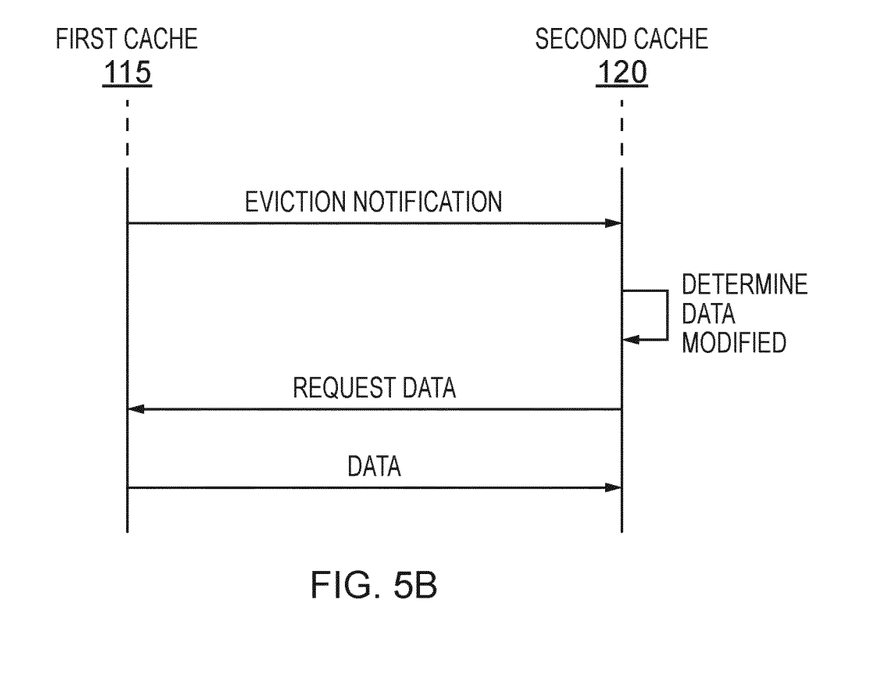

FIGS. 5A and 5B depict example operational flows associated with the above-described eviction processes.

FIG. 5A depicts an operational flow, between the first cache 115 and second cache 120, corresponding to FIGS. 4A to 4C. The first cache 115 requests data from the second cache 120. The second cache 120, in response, provides the requested data to the first cache 115. The second cache 120 then marks the data as pseudo-invalid.

At a later time, the first cache 115 issues an eviction notification to the second cache, indicating that it is to evict the data and that the data has not been modified. The second cache 120 determines that it still has the pseudo-invalid copy of the data, and that the data is unmodified. In response to this, the second cache 120 marks its copy of the data as valid.

FIG. 5A depicts an operational flow, between the first cache 115 and second cache 120, corresponding to FIGS. 4D and 4E (prior to this the flow proceeds as the first part of FIG. 5A).

The first cache 115 issues an eviction notification to the second cache. Unlike Figure this eviction notification indicates that the data was modified after being provided to the first cache 115. Having received this, the second cache 120 determines that the data has been modified and thus that its copy (even if that copy has not been evicted) does not have the correct value. The second cache 120 thus transmits a data request to the first cache 115 which, in response, transmits the modified data to the second cache 120. The second cache 120 is thus provided with an up-to-date copy of the data.

Apparatuses and methods are thus provided for reducing power and bandwidth consumption within a cache hierarchy.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

We claim:

1. An apparatus comprising:
    processing circuitry configured to issue access requests in respect of data;
    first cache circuitry for storing temporary copies of data from a memory, for providing to the processing circuitry in response to corresponding access requests;
    second cache circuitry for storing temporary copies of data from the memory, for providing to the first cache circuitry in response to corresponding access requests, wherein the second cache circuitry has an access latency higher than an access latency of the first cache circuitry, wherein:
        the second cache circuitry is responsive to receiving a request for data stored within the second cache circuitry to:
            identify said data as pseudo-invalid data; and,
            provide said data to the first cache circuitry, the second cache circuitry is responsive to receiving an eviction indication, indicating that the first cache circuitry is to evict said data, to:
                responsive to determining that said data has not been modified since said data was provided to the first cache circuitry, identify said pseudo-invalid data as valid data.

2. The apparatus according to claim 1, wherein the second cache circuitry is configured to select data to evict, said selecting comprising preferentially selecting pseudo-invalid data relative to valid data.

3. The apparatus according to claim 2, wherein said selecting comprises preferentially selecting invalid data relative to pseudo-invalid data.

4. The apparatus according to claim 1, wherein the second cache circuitry is configured to identify said data as pseudo-invalid data by setting a pseudo-invalidity indicator in respect of said data.

5. The apparatus according to claim 1, wherein the second cache circuitry is configured to identify said data as pseudo-invalid data by:

maintaining a priority indicator in respect of said data; and, assigning a minimum priority indicator value to said data.

6. The apparatus according to claim 1, wherein:

the second cache circuitry is responsive to receiving the eviction indication to, responsive to determining that said data has been modified since said data was provided to the first cache circuitry, transmit to the first cache circuitry a return request for said data; and, the first cache circuitry is responsive to receiving said return request to provide said data to the second cache circuitry to replace said pseudo-invalid data.

7. The apparatus according to claim 6, wherein:

the second cache circuitry is configured to provide said data to the first cache circuitry with an associated modification indicator;

the first cache circuitry is configured to:

responsive to modifying said data, set the modification indicator to indicate said modification; and, transmit, to the second cache circuitry, said eviction indication comprising the modification indicator, and the second cache circuitry is configured to perform said determining that said data has been modified based on the modification indicator.

8. The apparatus according to claim 7, wherein the second cache circuitry is configured to provide said modification indicator to the first cache circuitry responsive to determining that a cache line comprising said data is a dirty cache line.

9. The apparatus according to claim 1, wherein the first cache circuitry is configured, when evicting said data which is identified in the second cache circuitry as pseudo-invalid data, to not provide said data to the second cache circuitry absent a data request from said second cache circuitry.

10. The apparatus according to claim 1, wherein the first cache circuitry and the second cache circuitry are configured to implement a non-inclusive cache hierarchy.

11. The apparatus according to claim 1, wherein the second cache circuitry is configured to operate as a shared cache with respect to said processing circuitry and second processing circuitry.

12. The apparatus according to claim 1, wherein the first cache circuitry and the second cache circuitry are configured to provide said data by providing a cache line comprising said data.

13. A method comprising:

storing, in first cache circuitry, temporary copies of data from a memory, for providing to processing circuitry in response to corresponding access requests;

storing, in second cache circuitry, temporary copies of data from the memory, for providing to the first cache circuitry in response to corresponding access requests, wherein the second cache circuitry has an access latency higher than an access latency of the first cache circuitry;

transmitting, from the first cache circuitry to the second cache circuitry, a request for data stored within the second cache circuitry;

responsive to the second cache circuitry receiving the request for said data:

identifying, by the second cache circuitry, said data as pseudo-invalid data; and, providing said data from the second cache circuitry to the first cache circuitry, transmitting an eviction notification from the first cache circuitry to the second cache circuitry, indicating that the first cache circuitry is to evict said data; and, responsive to the second cache circuitry receiving the eviction notification, and responsive to determining that said data has not been modified since said data was provided to the first cache circuitry, identifying, by the second cache circuitry, said pseudo-invalid data as valid data.

14. A system comprising:

memory circuitry;

processing circuitry configured to issue access requests in respect of data stored in the memory circuitry;

first cache circuitry for storing temporary copies of data from the memory circuitry, for providing to the processing circuitry in response to corresponding access requests;

second cache circuitry for storing temporary copies of data from the memory circuitry, for providing to the first cache circuitry in response to corresponding access requests, wherein the second cache circuitry has an access latency higher than an access latency of the first cache circuitry, wherein:

the second cache circuitry is responsive to receiving a request for data stored within the second cache circuitry to:

identify said data as pseudo-invalid data; and, provide said data to the first cache circuitry, the second cache circuitry is responsive to receiving an eviction indication, indicating that the first cache circuitry is to evict said data, to:

responsive to determining that said data has not been modified since said data was provided to the first cache circuitry, identify said pseudo-invalid data as valid data.

* * * * *